United States Patent [19]

Marlett et al.

[11] Patent Number: 4,778,668

[45] Date of Patent: Oct. 18, 1988

[54] PREPARATION OF SILANE AND METAL ALUMINUM HALIDE CO-PRODUCT

[75] Inventors: Everett M. Marlett; Robert N. DePriest, both of Baton Rouge, La.

[73] Assignee: Ethyl Corporation, Richmond, Va.

[21] Appl. No.: 944,756

[22] Filed: Dec. 22, 1986

[51] Int. Cl.$^4$ .................... C01B 33/04; C01B 9/00
[52] U.S. Cl. ................... 423/347; 423/463; 423/495; 423/499
[58] Field of Search ............. 423/347, 463, 495, 499

[56] References Cited

U.S. PATENT DOCUMENTS

| | | | |
|---|---|---|---|
| 3,968,199 | 7/1976 | Bakay | 423/347 |
| 3,992,432 | 11/1976 | Napier et al. | 558/344 |
| 4,113,845 | 4/1978 | Litteral | 423/347 |
| 4,474,743 | 10/1984 | Marlett | 423/347 |
| 4,613,491 | 9/1986 | Jung et al. | 423/347 |
| 4,632,816 | 12/1986 | Marlett | 423/347 |

FOREIGN PATENT DOCUMENTS 851962  10/1960  United Kingdom ............. 423/347

OTHER PUBLICATIONS

Finholt, J. Am. Chem. Soc. 69,2692 (1947).
Chemical Abstracts 98,200736c (1983).
Ehrlich et al, Inorganic Chemistry, 4, 758 (1965).
Gevorgyan et al, J. Chem. Soc. Chem. Comm. 1234 (1985).
Lewis et al, J. Electrochem Soc. 108, 1114 (1961).

*Primary Examiner*—John Doll
*Assistant Examiner*—Lori S. Freeman
*Attorney, Agent, or Firm*—John F. Sieberth; Robert A. Linn

[57] ABSTRACT

Silicon halides and silicon hydrohalides, such as $SiCl_4$, $SiBr_4$, and $SiHCl_3$ react with alkali metal aluminum hydrides such as $NaAlH_4$ and $LiAlH_4$ in the presence of a hydrocarbon reaction medium; e.g., toluene, and a tetraalkyl ammonium salt, and in the substantial absence of an ether, to produce silane and a metal aluminum halide co-product which is not tightly complexed to an organic substance.

14 Claims, No Drawings

PREPARATION OF SILANE AND METAL ALUMINUM HALIDE CO-PRODUCT

CROSS REFERENCE TO RELATED APPLICATIONS

Application Ser. No. 782,972, filed Oct. 2, 1985, now U.S. Pat. No. 6,665,207 pertains inter alia to the production of amine alanes from amines, sodium aluminum hydride, and sodium aluminum tetrachloride. Related reactions are also disclosed.

Application Ser. No. 701,947 filed Feb. 15, 1985. now U.S. Pat. No. 4,632,816 pertains inter alia to the preparation of silane and a valuabl sodium-aluminum-fluorine co-product by a process comprising reaction of $SiF_4$ with $NaAlH_4$. Use of $KAlH_4$ is also disclosed.

Application Ser. No. 926,662 filed Nov. 4, 1986, pertains inter alia to the reaction of $NaAlH_4$, $SiCl_4$ and a tertiary amine. The amine alane can be reacted with $SiF_4$ to produce additional silane using the method of U.S. Pat. No. 4,474,743.

The above-cited patent documents are commonly assigned with this application.

FIELD OF THE INVENTION

This invention relates to the preparation of silane, $SiH_4$. As an intermediate, it is employed in the preparation of polysilicon, which in turn is used to prepare monocrystalline silicon for use in semiconductor devices. Silane also has other important uses in the production of electronic equipment and devices.

RELATED ART

Allied, British Pat. No. 851,962, teaches the reaction of sodium aluminum tetrahydride with silicon tetrachloride, and it sets forth the following equation:

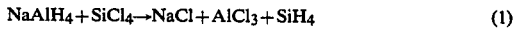

$$NaAlH_4 + SiCl_4 \rightarrow NaCl + AlCl_3 + SiH_4 \qquad (1)$$

The reference also teaches that $KAlH_4$ and $LiAlH_4$ can be used in the reaction. Furthermore, the reference discloses that silicon tetrabromide, trichlorosilane and and silicon tetrafluoride can be used in place of $SiF_4$.

The gist of the Allied reference is the addition of an alkaline earth metal hydride to the reaction mixture of equation (1). The alkaline earth metal hydride lowers the amount of boron impurity in the silane product. Other references which relate to the reaction of $LiAlH_4$ with $SiCl_4$ are Finholt, *J. Am. Chem. Soc.* 69, 2692 (1947), and Lewis et al, *J. Electrochem Soc.* 108. 1114 (1961).

Turning now to other art, Gevorgyan et al, *J. Chem. Soc., Chem. Commun.*, 1234 (1985), discloses that ketones, alkyl and aryl halides, nitriles, and amides undergo reduction with a lithium aluminum hydride-hydrocarbon, two-phase system, in the presence of phase-transfer catalysts (crown ethers and quaternary ammonium salts).

*Chem Abstracts* 98, 200736e (1983) teaches or $SiHCl_3$ is reduced with Li, Na, K, or Ca hydride in the presence of various crown ethers used to dissolve the hydride in an organic solvent. The $SiH_4$ yield in a reported example was 100%.

Ehrlich et al, *Inorganic Chemistry*, 4, 758 (1965) discloses that quaternary ammonium salts react with $LiAlH_4$ to yield tetraalkylammonium aluminohydrides; e.g., $(CH_3)_4NAlH_4$.

SUMMARY OF THE INVENTION

This invention provides a process wherein: (1) a silicon tetrahalide or silicon hydrohalide reacts with (2) an alkali metal aluminum hydride, in the presence of (a) a hydrocarbon reaction medium, and (b) a reaction promoting quantity of a quaternary ammonium halide. The process produces silane and a metal aluminum chloride co-product in uncomplexed (or a loosely-bound complex) form.

In the prior art, the reaction is conducted in the presence of sufficient quantity of an ether to solubilize the metal aluminum hydride. This facilitates the reaction, but as explained above, the ether may form a complex with the metal aluminum halide co-product, rendering the co-product unsuitable for some uses. Furthermore, the ether complex makes it more difficult or more costly to transport or recover metal values from the metal-aluminum-halide complex. Moreover, metal aluminum hydride/ether mixtures can become potentially hazardous if safe temperatures are exceeded. Therefore, the process of this invention offers several advantages over the prior art process, in which an ether is used as a reaction medium.

Preferred hydride reactants are the alkali metal aluminum hydrides, more preferably $LiAlH_4$ and $NaAlH_4$. Preferred silicon-containing reactants are $SiCl_4$, $SiBr_4$, $SiHCl_3$, and such like.

The silane produced by this invention can be used in the semiconductor materials field; e.g., as an intermediate for the production of polysilicon.

DESCRIPTION OF PREFERRED EMBODIMENTS

This invention provides an improved process for the preparation of silane utilizing a metal aluminum hydride as a one starting material, and a silicon tetrahalide or silicon hydrohalide as the other. The invention comprises use of a quaternary ammonium salt to promote the reaction Preferably, the process is conducted in the presence of an inert hydrocarbon reaction medium and in the substantial absence of an ether.

In a highly preferred embodiment, this invention provides an improved process for the preparation of silane by the reaction of: (i) a silicon tetrahalide or silicon hydrohalide selected from $SiCl_4$, $SiBr_4$ and $SiHCl_3$, and (ii) an alkali metal aluminum tetrahydride, $MAlH_4$, wherein M is an alkali metal selected from Li, Na, and K; said process being conducted in the presence of a promoter quantity of a quaternary ammonium halide, and in the substantial abence of an ether reaction medium. Thus, this embodiment represents an improvement in the process of Equation (1) and also an improvement for similar reactions.

As taught above, this invention comprises use of a metal aluminum hydride as a reactant. Preferred compounds are the alkali metal aluminum hydrides having the formula $MAlH_4$. All three compounds $LiAlH_4$, $NaAlH_4$ and $KAlH_4$ can be used. The potassium compound is not readily available in commerce at this time; therefore, its use is not preferred. Instead, it is preferred to use $NaAlH_4$ or $LiAlH_4$; and since it is much cheaper, the sodium compound is more preferred. The compound, $Na_3AlH_6$, can also be used in this invention in a manner analogous to $NaAlH_4$. Thus, its reaction with a silicon halide or hydrohalide in accordance with the teachings herein, is considered an embodiment of this invention.

In this invention, SiCl$_4$ is a preferred source of silicon. Other materials such as SiBr$_4$, SiI$_4$, Si$_2$Cl$_6$, and SiBr$_2$Cl$_2$ can also be used. Similarly, compounds such as SiH$_2$Cl$_2$ and SiHCl$_3$ may also be employed. Thus, this invention comprises the use of silicon tetrahalides, SiX$_4$, and hexahalides, Si$_2$X$_6$ wherein the halogens are alike or different, and have an atomic number of at least 17. Also, the invention comprises use of silicon hydrohalides having the formula SiH$_x$X$_y$, wherein X has the same significance as above, $x \geq 1$ and $x+y=4$.

In the process of this invention, use of an inert liquid reaction medium is preferred. Liquid media facilitate contacting the reactants, transfer of reaction materials, and work up of the resultant reaction mass. Inert liquid reaction media that are relatively inexpensive are preferred. Other factors in choice of a liquid reaction medium are: complexing ability (or lack thereof), boiling point, melting point, level of toxicity, etc.

Hydrocarbons are suitable reaction media, and a suitable material can be selected from aromatic or aliphatic substances. Of the aromatic hydrocarbons, benzene and the lightly substituted benzenes are preferred. These are exemplified by toluene, the xylenes, mesitylene, isopropylbenzene, and the like. Alkanes, such as the straight chain paraffins; e.g., hexane, heptane, nonane and the like can also be used. The exact nature and/or structure of the hydrocarbon is not critical. Toluene is highly preferred.

As mentioned above, the process of this invention is conducted in the substantial absence of ethers. Ethers may complex with the M—Al—X co-product that is formed, and the resultant complex may bind the complexed co-product rather tightly. From the standpoint of this invention, this complexation is undesirable, and consequently the use of ethers is avoided.

The quaternary ammonium salts used as promoters in the process of this invention can be selected from a wide variety of substances. The preferred compounds have the formula (R$_1$R$_2$R$_3$R$_4$N)X wherein X is an anion (which will bond to the cationic species comprising the four "R" groups and the nitrogen) preferably a halide selected from chloride or bromide, and R$_1$–R$_4$ are alike or different monovalent, hydrocarbon radicals selected from alkyl, alkenyl, aryl, aralkyl, alkaryl, and cycloalkyl radicals. Preferably, each R is an alkyl radical, and preferably at least two of R$_1$–R$_4$ are the same. The total number of carbon atoms in R$_1$–R$_4$ is preferably 12 or higher, and more preferably is from 12 to about 40. There is no real upper limit on the number of carbon atoms, but practical considerations impose some noncritical criteria that are well known to one skilled in the art. For example, the quaternary ammonium compounds should be fairly inexpensive, should facilitate contacting of the reactants, and be fairly stable under the reaction conditions employed, at least to the extent that decomposition does not unduly complicate the process. Preferably, the quaternary ammonium halide is recoverable for re-use, at least to an appreciable extent. The nature of the anion portion of the salt is not critical. It, for example, can be a complex radical or as illustrated above, a halide.

The following equation illustrates a reaction utilized in this invention, in addition to that depicted by equation (1).

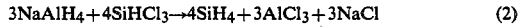

$$3NaAlH_4 + 4SiHCl_3 \rightarrow 4SiH_4 + 3AlCl_3 + 3NaCl \quad (2)$$

Equations (1) and (2) illustrate the relative molar quantities of reactants theoretically required for reactions of this invention. Stated another way, the equations illustrate the stoichiometric quantities of reactants involved. If materials other than those in the above equation are used, for example, SiH$_2$Cl$_2$ and Si$_2$Cl$_6$, then the process of this invention will entail use of other mole ratios of reactants, as readily appreciated by a skilled practitioner.

Generally speaking, the process of this invention is carried out using stoichiometric or approximately stoichiometric quantities of reactants. In some instances it may be desirable to use an excess of one reactant in order to assist driving the reaction to completion. Thus for example, a 5 mole %, 10 mole % or larger excess of one reactant can be used for this purpose. In general, very large excess quantities of a reactant do not confer an additional benefit; hence, such excesses are usually avoided. The process is preferably conducted using the metal aluminum hydride as the limiting reactant.

For this invention, sufficient quaternary ammonium halide is employed to obtain a finite increase in yield over that obtained when the quaternary ammonium halide promoter is not used. It is preferred to use an amount of the promoter which results in an appreciable increase in silane yield. Generally, less than one mole of quaternary ammonium halide—per mole of metal aluminum hydride reactant—is used. It is preferred that the amount of quaternary ammonium halide be within the range of from about 2 mole percent to about 50 mole percent, based on the amount of MAlH$_4$ employed. More preferably, the amount of quaternary ammonium halide promoter is between about 5 to about 25 mole percent.

The amount of liquid reaction medium employed is not a critical feature of the invention. It is preferred to use enough liquid to facilitate contacting the reactants and to accomplish any other purpose or purposes for which the inert liquid is employed. There is no real upper limit on the amount of liquid used, but there are some practical restrictions imposed by such considerations as reaction vessel size, ease of material transport, raw material costs, etc. A skilled practitioner, especially one with experience using metal hydrides such as MAlH$_4$, can readily select an amount of liquid to use by employing the ordinary skill of the art. In general, the concentration of MAlH$_4$ in inert, liquid is within the range of from about 1% to about 25% preferably from about 1% to about 10%.

The process is conducted at a temperature that affords a reasonable yield of product within a reasonable time. Thus the process is conducted at a temperature not so low that the reaction rate is unduly retarded, and not so high as to cause an undue amount of decomposition of products or reactants or an undue amount of extraneous side reactions. Reaction temperatures between about 50° C. and the refluxing temperature of the liquid can be employed. Preferred temperatures are from about 70° C. to about 120° C.

The process is preferably conducted at ambient pressure. However, it is to be understood that the process can be conducted at higher or lower pressures, if desired.

The process is conducted for a period of time sufficient to give a satisfactory yield. Usually the reaction can be completed in less than a day. Preferred reaction times are less than 12 hours, more preferably from one to about 8 hours.

From the above discussion it should be clear to a skilled practitioner that the process conditions employed with the process are not critical parts of this invention.

The following examples illustrate the invention but do not limit it.

EXAMPLE I

To a 50 mL, 3-neck, round bottom flask was added 0.57 g of NaAlH$_4$ (recrystallized, 97% 0.0105 mol), 0.25 g of benzyltriethylammonium chloride (Aldrich 99%, dried, 0.011 mol, 10 mol %) and 14.2 g of dry toluene. The flask was attached to a gas collection train with a H$_2$ flush, dry ice-cooled condenser, and liquid nitrogen-cooled trap. To the flask (while sweeping with H$_2$) was added 0.010 mole of SiF$_4$ over a period of about one hour while maintaining the flask contents at 50°–52° C. Gas chromatographic analysis of the gaseous product indicated th silane yield was 0.13%.

Next, 0.010 mol of SiCl$_4$ in 4.3 g of toluene was added to the flask. Addition took place over a period of 15 min. Then the flask was maintained at 75° C. for another 45 minutes. The gaseous product was trapped, and then allowed to expand into a calibrated section of the collection train. Gas chromatographic analysis of the gas indicated the silane yield was 7.5%.

Repeating the above reaction of SiF$_4$ with NaAlH$_4$ using a sealed reaction vessel, a reaction temperature of 80° C., and tetra-n-butylammonium bromide (10 mole %) increased the silane yield to 1.6%.

EXAMPLE II

To a 50 mL, 3-neck, round bottom flask was added 0.57 g of recrystallized NaAlH$_4$ (0.0105 mol), 0.33 g of (C$_{8-10}$H$_{17-21}$)$_2$(CH$_3$)$_2$NCl (0.001 mol) and 10.7 g of dry toluene. To a 25 mL dispensing funnel was added 1.70 g of SiCl$_4$ (0.010 mol) in 4.3 g of dry toluene.

The flask and attached funnel were connected to the gas collection train and swept with H$_2$. The condenser above the reactor was held at $-60°$ C. to $-70°$ C. with solid CO$_2$. The trap was cooled with liquid nitrogen, and the round bottom flask held at 80° C. While stirring the contents of the flask, the SiCl$_4$ was added dropwise over a period of 15 minutes. Thereafter, the flask was maintained at 80° C. for 4 hours while admitting a very slow stream of hydrogen.

After four hours the trap was isolated, pumped down, and the product in the trap warmed and measured. The product recovery was 0.0071 mol GC/MS; i.e. gas chromatography/mass spectrometric analysis indicated the product was silane with a trace of water. The silane yield was 70%.

When the reaction was essentially repeated using SiF$_4$ and the same quaternary ammonium halide promoter, the silane yield was about 1%.

The experimental results indicate that SiF$_4$ is much less reactive than SiCl$_4$ in the process of this invention. It is believed the low reactivity is due to the low solubility of the NaAlH$_4$ reactant in the non-ether reaction medium as well as formation of an insoluble AlF$_4^-$ species which may also hamper attack of gaseous SiF$_4$ on the solid NaAlH$_4$.

The experimental results also indicate that for SiCl$_4$, it is expedient to use a process temperature higher than 50° C. For this reason, temperatures above about 70° C. are preferred.

The process of this invention can be conducted by using LiAlH$_4$ or KAlH$_4$ in place of the NaAlH$_4$ employed in the above examples. The NaAlH$_4$ can also be replaced with Na$_3$AlH$_6$.

The process of this invention can be conducted using SiBr$_4$ and SiHCl$_3$ in place of the SiCl$_4$ used in the above examples. The process of the above examples can be carried out using a quaternary ammonium halide R$_1$R$_2$R$_3$R$_4$N$^+$X$^-$ in which each radical indicated by R has up to preferably about 12 carbon atoms. Such halides are exemplified by the compounds:
dodecyltrihexylammonium bromide
trioctylethylammonium bromide
tridecylmethylammonium chloride
didodecyldimethylammonium chloride
tetraheptylammonium iodide
tridecylbenzylammonium chloride
benzyltrimethylammonium chloride
trihexylmethylammonium chloride Modifications or variations can be made in the abovedescribed process steps, reaction conditions, or starting materials employed, without departing from the basic principle or principles upon which the invention is based. For example, the halides used as promoters and mentioned above can be replaced by corresponding salts wherein the anion portion is not a halide but a complex species and the like. Such modifications as this are deemed to be within the spirit and scope of the invention, as set forth in the claims appended below or reasonable equivalents thereof.

We claim:

1. An improved process for the preparation of silane by the reaction of (i) a silicon tetrahalide or hydrohalide selected from SiCl$_4$, SiBr$_4$ and SiHCl$_3$, and (ii) an alkali metal aluminum tetrahydride, MAlH$_4$, wherein M is an alkali metal selected from Li, Na, and K, said reaction being conducted in the presence of a promoter quantity of a quaternary ammonium salt and in the substantial absence of an ether reaction medium.

2. The process of claim 1 wherein said silicon tetrahalide is silicon tetrachloride.

3. The process of claim 1 wherein said alkali metal aluminum tetrahydride is LiAlH$_4$ or NaAlH$_4$.

4. A process for the preparation of silane and an alkali metal-aluminum-chloride co-product substantially free of complexation with an ether, said process comprising reacting SiCl$_4$ and NaAlH$_4$ in the presence of a promoter quantity of a quaternary ammonium halide, and in the substantial absence of an ether reaction medium.

5. The process of claim 4 wherein said promoter quantity of quaternary ammonium halide is from about 5 to about 25 mole percent.

6. The process of claim 1 wherein said tetrahydride is NaAlH$_4$.

7. The process of claim 1 being conducted at a temperature of from about 70° C. to about 120° C.

8. An improved process for the preparation of silane by the reaction of (i) a silicon tetrahalide SiX$_4$, or a silicon hexahalide Si$_2$X$_6$, or a silicon hydrohalide SiH$_x$X$_y$, wherein the radicals represented by X in the above formulas are halides which are alike or different, and which have an Atomic Number of at least 17, and x is $\geq 1$ and x+y=4, with (ii) sodium aluminum tetrahydride, NaAlH$_4$; said process being conducted (a) in the presence of a promoter quantity of a quaternary ammonium salt, and (b) in the presence of a hydrocarbon liquid reaction medium, and (c) int the substantial absence of an ether reaction medium.

9. The process of claim 8 wherein SiCl$_4$ is reacted with NaAlH$_4$.

10. The process of claim 8 wherein said hydrocarbon is an aromatic hydrocarbon.

11. The process of claim 9 wherein said hydrocarbon is toluene.

12. The process of claim 8 wherein said quaternary ammonium salt is a quaternary ammonium halide.

13. The process of claim 11 wherein said quaternary ammonium halide is $(C_{8-10}H_{17-21})_2 (CH_3)_2 NCl$.

14. The process of claim 8 being conducted at a temperature of from about 70° C. to about 120° C.

* * * * *

UNITED STATES PATENT AND TRADEMARK OFFICE
CERTIFICATE OF CORRECTION

PATENT NO. : 4,778,668
DATED : October 18, 1988
INVENTOR(S) : Everett M. Marlett and Robert N. DePriest It is certified that error appears in the above-identified patent and that said Letters Patent is hereby corrected as shown below:

Column 1, line 8 reads "6,665,207" and should read -- 4,665,207 --.

Column 1, line 12 reads "1985." and should read -- 1985, --.

Column 1, line 15 reads "valuabl" and should read -- valuable --.

Column 2, line 40 reads "reaction  Preferably" and should read -- reaction.  Preferably --.

Column 2, line 51 reads "abence" and should read -- absence --.

Column 5, line 19 reads "indicated th" and should read -- indicated the --.

Column 6, line 19 reads "abovedescribed" and should read -- above-described --.

Column 6, line 65 reads "int the" and should read -- in the --.

Signed and Sealed this

Twenty-fifth Day of April, 1989

*Attest:*

DONALD J. QUIGG

*Attesting Officer*  *Commissioner of Patents and Trademarks*